United States Patent Office 3,361,778
Patented Jan. 2, 1968

3,361,778
CHELATED COMPOUNDS OF VANADIUM AND SUBSTITUTED PHENOLS
Charles John Pedersen, Salem, N.J., assignor to E. I. du Pont de Nemours and Company, Wilmington, Del., a corporation of Delaware
No Drawing. Filed Apr. 20, 1964, Ser. No. 361,237
3 Claims. (Cl. 260—429)

This invention relates to novel compounds and their preparation. More particularly, this invention relates to chelated compounds of vanadium and substituted phenols.

A class of novel compounds of this invention may be represented by the formula

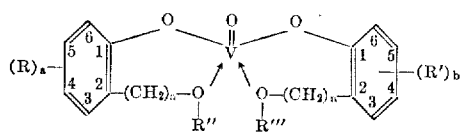

wherein

R and R' are $C_1$–$C_{12}$ alkyl
$a$ and $b$ are 0, 1 or 2
$n$ is 0 or 1
R" and R'" are H or $C_1$–$C_{12}$ alkyl when $n$ is 1; and when $n$ is 0, R" and R'" together form a single $C_2$–$C_{10}$ alkylene radical.

These compounds may be prepared by the reaction of a vanadyl salt capable of yielding the vanadyl ion [VO++] in the reaction medium with an ortho-substituted phenol in the presence of a base. If the compound to be prepared is one where the R" and R'" groups are hydrogen or alkyl, the ortho-substituted phenol is

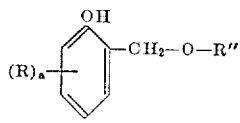

however, if the compound to be prepared is one wherein the R" and R'" groups form a single divalent alkylene group, the substituted phenol is a diphenol of the formula

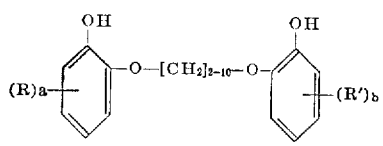

The vanadium compound is generally soluble in the reaction medium; representative compounds are $VOSO_4$, $VOCl_2$, $VOBr_2$, VO(acetate)$_2$, and VO(2-ethylhexanoate)$_2$.

In each case the phenol provides the ligand which becomes attached to vanadium. The reactants are used in approximately stoichiometric amounts. Each phenolic hydroxyl group will require one equivalent of vanadium compound and one equivalent of base, e.g., alkyl metal alkoxide or ammonia. If a lesser proportion of either reagent is provided, the chelate product will be contaminated with unreacted phenolic compound. The use of excess base or vanadium compound is unnecessary, increases the cost of the process, and may make the recovery of product less convenient. The base serves to convert the phenol to phenoxide ion and, therefore, any base which effects this without otherwise interfering with the desired reaction will be suitable.

In the usual practice the phenolic compound is dissolved in an alcoholic solvent, e.g., n-propanol, or a mixture of solvents, e.g., n-propanol and methanol. This solution is then mixed with an alcoholic solution of the base, e.g., a methanolic solution of 95% sodium methoxide. Introduction of the vanadium compound leads to chelate formation. Preferably, the vanadium compound is dissolved in the minimum amount of water which, optionally, can be further diluted with methanol. If desired, the order can be varied; for example, one can mix the phenol and the vanadium compound, and subsequently introduce concentrated ammonia. The temperature is not critical, but it should be high enough to keep each component in solution. Typically, vanadyl sulfate polyhydrate is dissolved in water at 50° C. before being added to the rest of the components.

The chelate forms essentially at once and may be isolated when convenient. The volatile solvents and any volatile reaction by-products, e.g., alcohol derived from the alkoxide, are then distilled leaving behind a mixture of the vanadium chelate and the inorganic salt formed from the alkali metal and the anion of the starting vanadium compound. Since the chelate is generally very soluble in the typical hydrocarbon solvents, it is isolated by treating the residue with benzene, mechanically separating the insoluble inorganic material, e.g., by filtration or centrifuging, and removing the solvent.

As noted above, the ligand-forming phenol compounds fall into two general classes. The members of the first class have only one phenolic hydroxyl group per molecule and are represented by the formula

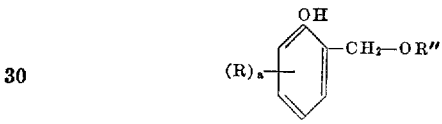

They may be made by introducing a methylol group onto a phenolic nucleus by employing equimolar amounts of phenolic compound, alkali metal hydroxide, and formaldehyde (frequently as a 37% by weight aqueous solution). An alkali-metal salt of the phenol is formed first, then formaldehyde is added. The free phenolic product is liberated by neutralizing with an equivalent amount of an acid, e.g., acetic acid. The members of the second class are compounds having two phenolic hydroxyl groups per molecule and are represented by the formula

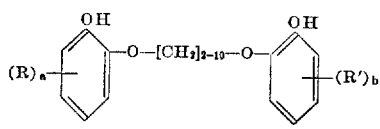

Representative compounds can be made from the dihydropyran monoacetals of alkyl-substituted catechol under basic conditions wherein a half-molar portion of an α,ω-dibromoalkane is reacted in the presence of a molar portion of alkali hydroxide. Frequently, heat is added during the reaction and reflux temperature or a temperature close to 100° C. is used. In the substitution reaction the halide is displaced from the dihaloalkane by the phenoxide group. The resulting coupling product is taken up in benzene to separate it from the alkali metal halide by-product. The free dihydric compound, obtained by decomposing the acetal groups on the coupling product conventionally with acid, is isolated by treating the reaction mixture with benzene to extract the phenol, filtering off the insoluble derivatives of the dihydropyran and concentrating the benzene filtrate.

In this reaction α,ω-dichloro-3-oxapentylene may be substituted in the preparation of the diphenol. Use of such a diphenol to produce the vanadium chelate will provide one with a chelate wherein R" and R'" form a single divalent 3-oxapentylene group as the alkylene radical.

Both the monophenols and diphenols described above are useful, e.g., as antioxidants, when used in a manner easily determined by those skilled in the art. However,

3 they are particularly useful as intermediates in the preparation of the vanadium chelates as described herein.

The invention will now be described with reference to the following examples of specific embodiments thereof wherein parts and percentages are by weight unless otherwise specified.

EXAMPLE 1

(A) *Preparation of phenolic compound [2,2'-trimethylenedioxybis(5-tert-butylphenol)]*

The following mixture is agitated at reflux under nitrogen at atmospheric pressure: 250 g. (1 gram-mole) of dihydropyran monoacetal of 4-tert-butylcatechol, 200 ml. of n-butanol, 40 g. (1 gram-mole) of sodium hydroxide, 300 ml. of water, and 101 g. (0.5 gram-mole) of 1,3-dibromopropane. The charge is then concentrated to dryness under vacuum, taken up with 1000 ml. of benzene at 60° C. and filtered to remove sodium bromide (typically 104.4 g., theory: 103 g.). The filtrate is concentrated under vacuum to give typically 269.4 g. of a brownish oil. This product is dissolved in 500 ml. of benzene at room temperature and extracted with three portions of 200 ml. of 5% aqueous sodium hydroxide, washed with 200 ml. of 10% aqueous sodium chloride, filtered and evaporated to dryness under vacuum. Typically, about 249 g. of a brown oily product is obtained (92.2% yield of 270 theoretical grams possible) which analyzes for $C_{33}H_{48}O_6$ (the dihydropyran bisacetal of the desired compound).

About 239 grams of this product are dissolved in 500 ml. of methanol containing 50 ml. of concentrated hydrochloric acid and allowed to stand at room temperature for about two days. The reaction mixture is evaporated to dryness under vacuum, taken up in 400 ml. of benzene, vigorously agitated with 400 ml. of water containing 50 ml. of concentrated hydrochloric acid, separated, and the benzene solution concentrated to dryness under vacuum. About 178 grams of a brown viscous oil are obtained (99.4% yield of 179 theoretical grams possible).

The pure product obtained from petroleum ether melts at about 81–84° C.

*Analysis.*—Calculated for $C_{23}H_{32}O_4$: C, 74.2; H, 8.6. Found: C, 73.7; H, 8.4–8.5.

(B) *Preparation of vanadyl chelate derivative of 2,2'-trimethylenedioxybis(5-tert-butylphenol)*

To 186 g. (0.5 gram-mole) of 2,2'-trimethylenedioxybis(5-tert-butylphenol) dissolved in 850 ml. of methanol at 40° C. are added 113 g. (0.5 gram-mole) of vanadyl sulfate polyhydrate (mol. wt. 226) dissolved in 200 ml. of water at 50° C. This mixture is vigorously agitated at 26° C. and to it are added slowly 65 ml. (1 gram-mole) of aqua ammonia (29% by weight, density 0.9 g./ml.) diluted with 250 ml. of methanol at room temperature (26° C.) Violet solids begin to form shortly after the addition of ammonia is started. The charge is stirred for about 30 minutes without external heating after all the ammonia has been added, and 2000 ml. of benzene at room temperature are poured into it in 10 minutes. The charge is heated to boiling and its volume subsequently reduced to 1000 ml. It is filtered hot to remove the ammonium sulfate, and the filtrate is evaporated to dryness under vacuum. About 186.4 grams of product are obtained (85% yield of 218.5 theoretical grams possible). It is a violet semi-solid which turns into a resin on standing.

The pure product recrystallized from benzene is a dark blue crystalline solid melting at 81–3° C.

*Analysis* (percent by weight).—Calculated: C, 63.1; H, 6.9; V, 11.7. Found: C, 62.7–63.0; H, 7.4; V, 11.5–11.7.

(C) *Prooxidant catalysis by vanadium chelate compound*

An oxidation study may be carried out by introducing 5 ml. sample of autoxidizable substance into a 250 ml. glass flask filled with air and protected from light by an aluminum foil covering. After the flask has been closed, the oxidation is followed by reading the fall in oxygen pressure with a manometer.

In one experiment the benzaldehyde contains 0.025 gram of the chelate compound of part B. The catalyst concentration is about 0.48% by weight or 0.055% vanadium. For purposes of comparison, a control may be made with benzaldehyde alone. It is found that at first the control consumes oxygen faster; however, after this initial period the sample containing the chelate consumes oxygen much more rapidly thereby illustrating the prooxidation catalysis.

EXAMPLE 2

(A) *Preparation of phenolic compound [4-(tert-butyl)-2-hydroxymethylphenol]*

After 300 g. (2 gram-moles) of 4-tert-butylphenol has been added to a solution of 84 g. (2.1 gram-moles) of sodium hydroxide in 1000 ml. of water at room temperature, the mixture is heated to 45° C. When everything is in solution, 164 g. (2.02 gram-moles) of 37% by weight formaldehyde are introduced. The mixture is shaken well under nitrogen at 25° C. for about 16 hours. To the resulting suspension of nearly white crystals is added a solution of 126 g. (2.1 gram-moles) of acetic acid in 300 ml. of water. The oil that separates is extracted with 1200 ml. of ether. After the ether solution has dried over sodium sulfate, it is filtered and concentrated under vacuum while rotated. About 358 g. of product is obtained. (Theory: 360 g. yield: 99.4%.)

*Analysis.*—Calculated: C, 73.3; H, 8.0; mol. wt., 180. Found: C, 73.7–74.0; H, 8.9; mol. wt., 193–196.

(B) *Preparation of vanadium chelate compound*

A 97.4-gram (0.54 gram-mole) sample of 4-tertbutyl-2-hydroxymethylphenol is dissolved at 26° C. in a mixture of 400 ml. of n-propanol and 300 ml. of methanol. Then 30.8 grams (0.54 gram-mole) of 95% sodium methoxide and 300 ml. of methanol are introduced. After everything is uniformly dispersed, a solution made by dissolving 63.2 grams (0.28 gram-mole) of $VOSO_4$ polyhydrate (mol. wt. 226) in 100 ml. of water and 300 ml. of methanol is added with vigorous agitation. A uniform grayish precipitate is formed. After the volume has been concentrated under vacuum to half the original value, 400 ml. of n-propanol is added. The resulting sodium sulfate precipitate is filtered off. Then the entire mixture is concentrated to dryness under vacuum to give about 92.1 grams of chelate in the form of a dark violet friable resin.

*Analysis.*—Calculated: C, 62.1; H, 7.1; V, 12.0; mol. wt. 425. Found: C, 63.5–63.6; H, 7.1–7.3; V, 11.1; mol. wt. 435. If it is desired to prepare a vanadium chelate wherein R″ and R‴ of the general formula are alkyl ($C_1$–$C_{12}$) instead of hydrogen, one should employ as the phenolic compound one having an alkyloxymethyl group in the 2-position instead of the compound of part A.

(C) *Oxidation of linseed oil*

The general oxidation procedure described in Example 1, part C, is employed using linseed oil in place of benzaldehyde. An experiment is carried out wherein 0.26% of the vanadium chelate compound of part B (0.028% vanadium) is added; in a control outside the scope of the present invention used for purposes of comparison, the chelate compound is omitted. The sample containing the chelate absorbs oxygen very rapidly.

At the end of the experiment it is observed that the linseed oil used in the control is essentially unchanged; no film forms. In contrast, the sample containing the vanadium chelate is more viscous; a film is present.

EXAMPLE 3

(A) *Preparation of phenolic compound [2,2'-hexamethylenedioxybis(5-tert-butylphenol)]*

The following mixture is refluxed at about 96–97° C. under nitrogen at atmospheric pressure for 21.5 hours: 109.6 g. (0.439 gram-mole) of the dihydropyran monoacetal of 4-tert-butyl catechol, 150 ml. of n-butanol, 17.6 g. (0.44 gram-mole) of sodium hydroxide, 150 ml. of water, and 53.6 g. (0.22 gram-mole) of 1,6-dibromohexane. The resulting mixture is then concentrated under vacuum. About 120.4 g. of residue is obtained and is dissolved in 300 ml. of methanol; the solution is cooled, treated with 15 ml. of concentrated hydrochloric acid, agitated at room temperature, and concentrated, while rotated under vacuum. The residue is treated with 250 ml. benzene. After the insoluble NaBr has been filtered off, the filtrate is concentrated under vacuum while rotated. About 90 g. of brown viscous oil are obtained. (About 99% yield of the theoretical 90.8 g.)

*Analysis.*—Calculated: C, 75.3; H, 9.2; mol. wt. 414. Found: C, 74.5; H, 9.3–9.4; mol. wt., 396.

(B) *Preparation of vanadium chelate compound*

A 47.6-gram (0.115 gram-mole) portion of 2,2'-hexamethylenedioxybis(5-tert-butylphenol) is dissolved in a mixture of 130 ml. of methanol and 170 ml. of n-propanol; 13.2 grams (0.232 gram-mole) of 95% sodium methoxide, dissolved in 130 ml. of methanol, is added. A solution, made by dissolving 39.5 grams (0.121 gram-mole) of $VOSO_4 \cdot nH_2O$ (mol. wt. 244) in 43 ml. of water at 60° C. and diluting with 130 ml. of methanol, is combined with the above composition while vigorous stirring is applied. After the mixture has been concentrated under vacuum to dryness, 170 ml. of n-propanol is added and the mixture is allowed to stand at 25° C. for about 20 hours. When this composition has been concentrated to dryness under vacuum, a dark violet resinous mixture weighing about 78.2 grams is obtained. A 500-ml. portion of acetone is added and the mixture is filtered cold through fine paper to remove the sodium sulfate which has been precipitated. Concentration of the filtrate gives about 45.6 grams of chelate [theoretical yield 55.1 grams, 82.8% yield].

*Analysis.*—Calculated: C, 65.1; H, 7.5; V, 10.7. Found: C, 64.0–64.3; H, 7.5–7.8; V, 7.9.

α-Terpinolene can be subjected to a prooxidation procedure similar to that of Example 1, part C, with similar results being obtained.

EXAMPLE 4

(A) *Preparation of phenolic compound [4(tert-butyl)-2-hydroxymethyl-6-methylphenol]*

About 328 g. (2 gram-moles) of 4-(tert-butyl)-o-cresol are introduced into a 2-liter flask containing a solution of 84 g. (2.1 gram-moles) of sodium hydroxide in 1000 ml. of water. When all the cresol has dissolved, 164 g. (2.02 gram-moles) of 37% by weight formaldehyde is added, the mixture is shaken well, allowed to stand at 25° C. for 5 days and acidified by introducing 126 g. (2.1 gram-moles) of glacial acetic acid in 300 ml. of water. The resulting mixture is extracted with one liter of benzene. Concentration of the benzene under vacuum gives about 377 g. of white crystals (97.1% of the theoretical yield of 388 g.).

(B) *Preparation of vanadyl chelate derivative*

To 77 g. (0.397 gram-mole) of 4-tert-butyl-2-hydroxymethyl-6-methyl-penol dissolved in 500 ml. of methanol and 350 ml. of isopropanol are added 22.6 g. (0.397 gram-mole) of 95% by weight sodium methoxide dissolved in 260 mol of methanol. To this solution are added slowly with vigorous agitation at 26° C., 46.2 g. (0.205 gram-mole) of vanadyl sulfate polyhydrate (mol. wt. 226) dispersed in 80 ml. of water and 240 ml. of methanol. The charge is stirred for about 30 minutes after all the vanadyl sulfate has been added, and evaporated to dryness under vacuum. The solids are taken up with 500 ml. of benzene at 80° C., 20 g. of diatomaceous earth ("Celite") are added and then filtered. The filtrate is concentrated under vacuum to give about 62 g. of dark blue resin (69% yield of 89.8 theoretical grams possible).

*Analysis.*—Calculated for $C_{24}H_{34}O_5V$: C, 63.6; H, 7.5; V, 11.2; mol. wt. 453. Found: C, 72.7–72.8; H, 8.2; V, 4.2; mol. wt. 425.

(C) *Prooxidation of safflower oil*

The autoxidation of safflower oil is tested according to the procedure described in Example 1, part C. A 5-ml. sample of safflower oil containing 0.025 g. of the chelate compound made in part A above is employed. The catalyst concentration in safflower oil is 0.54% or 0.023% vanadium. For purposes of comparison, a control is also tested containing no chelate compound. The sample containing the chelate absorbs oxygen much more rapidly and turns quite yellow indicating substantial oxidation.

EXAMPLE 5

(A) *Preparation of the phenolic compound [2,2'-decamethylenedioxybis(5-tert-butylphenol)]*

The following mixture is refluxed at about 96.2–98.2° C. under nitrogen at atmospheric pressure for about 27 hours: 122 g. (0.488 gram-mole) of the dihydropyran monoacetal of 4-tert-butyl catechol, 150 ml. of n-butanol, 19.5 g. (0.488 gram-mole) of sodium hydroxide, 150 ml. of water, and 73 g. (0.243 gram-mole) of 1,10-dibromodecane. After the volatiles have been concentrated under vacuum while rotated, the residue obtained is treated with 500 ml. of benzene at 25° C. The insoluble NaBr is filtered off and the filtrate concentrated to give about 138.8 g. of oily bisacetal. The phenolic product is isolated in accordance with the procedure of Example 1, part A. About 118.4 g. of brown oil is obtained (theoretical yield 115 g.).

*Analysis.*—Calculated: C, 76.6; H, 9.6; mol. wt. 470. Found: C, 73.9–74.0; H, 9.6–9.7; mol. wt. (cryscopic in benzene) 457–464.

(B) *Preparation of vanadium chelate compound*

A solution of 23 grams (0.101 gram-mole) of $VOSO_4$ tetrahydrate in 50 ml. of water is added to 47.6 g. (0.101 gram-mole) of 2,2'-decamethylenedioxybis(5-tert-butylphenol) dissolved in 250 ml. of methanol. Then a solution containing 13.2 ml. of concentrated ammonium hydroxide (0.202 gram-mole $NH_3$) dissolved in 200 ml. of methanol is introduced dropwise. Filtration and concentration of the filtrate yield about 36.7 g. of a dark violet mixture. Treatment with 400 ml. of benzene followed by separation of the $NH_4Br$ and concentration of the filtrate gives about 30.8 g. of chelate in the form of a dark violet semi-solid.

*Analysis.*—Calculated: C, 67.3; H, 8.2; V, 9.5. Found: C, 65.5–65.6; H, 8.5–8.6; V, 10.4–10.7. Its solubility in benzene at 25° C. is over 0.25 gram-mole per liter.

EXAMPLE 6

*Use of vanadium chelates as coordination catalysts*

(A) A monomer feed stream supplying ethylene (1 liter/min.) and propylene (3 liters/min.) is introduced into an agitated deep blue solution containing 0.1 g. of the vanadium chelate of Example 2 and 50 ml. of tetrachloroethylene at 25° C. After a half hour, 0.53 g. (0.003 gram-mole) of diisobutylaluminum monochloride is introduced as a one molar solution in n-hexane. Formation of the coordination catalyst is evidenced by the resulting brown color and monomer uptake. After the reaction has been carried out for about 30 minutes, the catalyst is deactivated with alcohol, the copolymer solution is extracted with dilute hydrochloric acid, washed acid free with water, and concentrated. An ethylene/propylene copolymer is formed.

(B) The procedure of part A is repeated except that 0.5 ml. of 1,4-hexadiene is added before the diisobutyl-aluminum monochloride has been introduced. A terpolymer of the three monomers is formed.

(C) The procedure of part A is repeated except that the vanadium chelate of Example 1 is employed. Similar results are obtained.

(D) The procedure of part B is repeated except that the vanadium chelate of Example 1 is employed. Similar results are obtained.

If it is desired to prepare the halide equivalents of the above-exemplified vanadium chelates wherein the $>V=O$ group is replaced by a $>VCl_2$ group, the vanadium compound employed should be one yielding a $VCl_2^{++}$ ion in the reaction medium, e.g., $VCl_4$.

An advantageous property of the chelated vanadium compounds of the present invention is their high solubility in different kinds of media, including hydrocarbons, esters, and non-hydroxylic polar organic compounds. The high solubility ensures uniform and complete dispersion in substrates. As mentioned above, these novel chelate compounds may be used to catalyze drying oils and may also be used as components of coordination catalysts for the preparation of polymers and copolymers of α-olefins.

In typical use as a "prooxidant" in drying oils about 0.25–0.75 weight percent of the chelated vanadium compound is introduced into the drying oil. The amount employed can be varied by those skilled in the art according to routine experiment in order to get the optimum drying rate desired for the particular application. The vanadium compounds can be also employed in the catalytic oxidation of aromatic aldehydes to carboxylic acids, e.g., conversion of benzaldehyde to anhydrous benzoic acid. Once again, the concentration can be selected according to routine experiments by those skilled in the art to suit the purpose at hand.

When the compounds of this invention are used in catalytic oxidation systems, there may be an initial period during which the rate of oxidation, as evidenced by oxygen absorption of the substrate containing the vanadium compound, is lower than that of a similar substrate containing no vanadium chelate. The duration of this induction period will depend on: (1) the structure of the vanadium chelate; (2) the purity of the vanadium chelate (if the vanadium content is low, the chelate is contaminated with free phenolic compound); (3) the response of the substrate (the autoxidizable substance to which the catalyst is added) to the particular phenolic compound; and (4) the susceptibility of the substrate to catalysis by vanadium compounds. This effect is illustrated by the data obtained in the experiment described in part C of Example 1 wherein the initial oxidation rate is not any higher for the benzaldehyde containing the vanadium chelate than for the control; however, after a period of time the aldehyde containing the oxidization proceeds at a noticeably faster rate.

It is sometimes desirable that the pro-oxidant catalyst display a delayed action of this type. For example, the shelf-life of an autoxidizable substrate containing the pro-oxidant catalyst will be longer, especially if the container has to be opened periodically and exposed to air. Further, an even substrate coating containing the pro-oxidant will be of higher quality than one made by too-rapid drying; the latter film will have solidified at the surface before the liquid away from the air interface has had a chance to harden. The impervious surface layer will greatly retard the hardening of the film as a whole thus conferring poor quality to a paint or varnish substrate.

The chelated vanadium compound can also be employed in the preparation of coordination catalysts. These catalysts can be made in the usual manner by mixing the vanadium chelate with an organic metallic reducing compound of a metal of groups I, II, and III, such as an aluminum trialkyl or a dialkyl aluminum monohalide. Depending upon the nature of the monomers being polymerized and the organo aluminum compound, the catalyst is made in the presence or the absence of the monomers. The coordination catalyst is employed in the conventional manner at temperature ranging from approximately −30 to +75° C. If desired, the coordination catalysts can be made up in halogenated solvents such as tetrachloroethylene or the hydrocarbon solution of coordination catalysts can be admixed with a halogen solvent. Typical copolymers which can be compared include ethylene/propylene and ethylene/propylene/non-conjugated diene copolymers.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A vanadium chelate compound represented by the formula

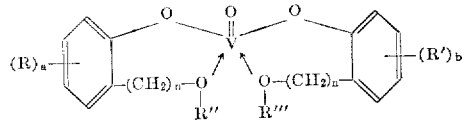

wherein
(1) R and R' are $C_1$–$C_{12}$ alkyl
(2) $a$ and $b$ are 0, 1 or 2
(3) $n$ is 0 or 1
(4) R'' and R''' are H or $C_1$–$C_{12}$ alkyl when $n$ is 1; and when $n$ is 0, R'' and R''' together form a single divalent $C_2$–$C_{10}$ alkylene radical.

2. The compound of claim 1 wherein R and R' are t-butyl; $a$ and $b$ are 1; $n$ is 1; and R'' and R''' are hydrogen.

3. The compound of claim 1 wherein R and R' are t-butyl; $a$ and $b$ are 1; $n$ is 0, and R'' and R''' together form a single divalent $C_2$–$C_{10}$ alkylene radical.

References Cited

UNITED STATES PATENTS

| | | | |
|---|---|---|---|
| 3,064,023 | 12/1962 | Wilkinson et al. | 260—429 |
| 3,119,851 | 1/1964 | Gladding et al. | 260—429 |
| 2,247,402 | 7/1941 | Perkins et al. | 260—619 |
| 2,248,831 | 7/1941 | Stillson et al. | 260—619 |
| 2,905,646 | 9/1959 | Natta et al. | 252—431 |
| 2,936,291 | 5/1960 | Peters et al. | 252—431 |

OTHER REFERENCES

Chemical Abstracts, vol. 51, pages 4800b (1957).
Zeitschrift fur Anorganische und Allgemeine Chemie, Bd. 315, No. 1–2, pages 118–120, 1962.

TOBIAS E. LEVOW, *Primary Examiner.*

P. D. FREEDMAN, HELEN S. SNEED,
*Assistant Examiners.*

UNITED STATES PATENT OFFICE
CERTIFICATE OF CORRECTION

Patent No. 3,361,778                           January 2, 1968

Charles John Pedersen

It is hereby certified that error appears in the above numbered patent requiring correction and that the said Letters Patent should read as corrected below.

Column 5, line 30, for "39.5 grams" read -- 29.5 grams --.

Signed and sealed this 6th day of May 1969.

(SEAL)
Attest:

Edward M. Fletcher, Jr.

Attesting Officer

Commissioner of Patents